Patented Jan. 7, 1941

2,227,637

UNITED STATES PATENT OFFICE 2,227,637

IMPREGNATING AND INSULATING MATERIAL

Rudolf Engelhardt, Leverkusen-I. G. Werk, Germany, assignor to I. G. Farbenindustrie Aktiengesellschaft, Frankfort-on-the-Main, Germany No Drawing. Application May 24, 1939, Serial No. 275,467. In Germany December 17, 1936

3 Claims. (Cl. 260—42)

The present invention relates to a new composition of matter suitable for being employed for insulating purposes and for filling interstices, for embedding or covering objects, such uses being referred to in the following as potting or compounding purposes.

The wax-like chlorinated naphthalenes (i. e. those of an average chlorine content between about 58% and about 60%) and the resin-like chlorinated diphenyls (chlorine content between about 60 and 62%) which are often employed for such purposes, for instance, in the preparation of cables or condensers, suffer from the disadvantage of a relatively low dropping or softening point. In consequence thereof, cables, condensers, transformators and the like containing such materials show an insufficient stability towards heat. It is the object of the present invention to do away with these disadvantages and to prepare a composition which is suitable for the purposes indicated above and keeps its shape even on a prolonged exposure to a temperature of about 100° C.

With these and other objects in view my invention consists in the composition comprising a preponderant amount of a wax-like chlorinated naphthalene or a resin-like chlorinated diphenyl and a smaller amount of polyvinylcarbazole. In general, the latter is present in the mixture in an amount of not more than about 7.5 per cent of the whole mixture. This figure represents the upper limit within which the polyvinylcarbazole can be incorporated within the said chlorinated material by mere melting and which is permissible without impairing the characteristic properties of such chlorinated materials or preventing their use for the purposes mentioned above. On the other hand, the incorporation within such chlorinated materials of polyvinylcarbazole (within the range defined above) effects a considerable rise of the flow or dropping point of such materials thus rendering the same more fit for the purposes for which they are intended. For giving an example, chlorinated naphthalenes of the character described can be employed as compounding agents in condensers for motor vehicles; in case they are arranged near the engine they are often exposed to a high temperature, so that the raising of the dropping point of such compounding agents forms a grave problem in the motor-car industry. On the other hand, chlorinated diphenyls are employed for impregnating fabrics for cables in order to increase their fire-proofness. In this case a rise of the softening point is desirable in order to prevent the impregnating materials from flowing away at a relatively low temperature.

The effect which is achieved by my present invention is illustrated by the following figures:

A wax-like chlorinated naphthalene of an average chlorine content of about 60% shows a considerable flow at 100° C.; upon the incorporation therewith of about 1.5% of polyvinyl carbazole this product keeps its shape even after a several month's heating to 100° C.; the amount of polyvinylcarbazole to be incorporated within the material can be increased up to about 7.5%, whereas in case of higher proportions of polyvinylcarbazole the capability of the product of being molten goes lost. A resin-like chlorinated diphenyl of an average chlorine content of about 62% has a flow point of 40°, whereas the incorporation therewith of about 7.5% of polyvinylcarbazole effects a rise of the flow point to 70° C.; a similar effect is to be observed in case lower amounts of polyvinylcarbazole are incorporated therewith. The effect involved by the present invention is contrary to all expectations as the softening point of such materials is generally reduced in case additional substances are incorporated therewith.

As to the preparation of polyvinylcarbazole which is employed in the present invention I refer to U. S. Patent No. 2,072,465 to Reppe et al. I am aware of the fact that it is proposed therein to employ chlorinated polynuclear aromatic hydrocarbons such as chlorinated naphthalene and chlorinated diphenyl as softeners for polyvinylcarbazole. Such compositions are proposed therein for use as artificial leather, foils for condensers and the like. The term "softeners" indicates that the chlorinated polynuclear aromatic hydrocarbons are employed in a minor proportion when compared with the polyvinylcarbazole, whereas according to the present invention the upper limit of the polyvinylcarbazole is about 7.5%. The compositions of the said U. S. Patent No. 2,072,465 represent thermoplastic materials which are not capable of being molten, whereas the compositions of this invention show the typical properties of chlorinated naphthalenes or chlorinated diphenyls and can be employed for impregnating potting or compounding purposes.

This application is a continuation-in-part application of my prior application Serial No. 178,659, filed December 8, 1937.

I claim:

1. The composition of matter comprising a chlorinated polynuclear aromatic hydrocarbon selected from the group consisting of chlorinated diphenyls and chlorinated naphthalenes, the said materials having homogeneously incorporated therewith a polymerized N-vinylcarbazole in an amount of not more than about 7.5% of the total mixture.

2. A composition of matter comprising a wax-like chlorinated naphthalene of an average chlorine content of about 60% and about 7.5% of polyvinylcarbazole.

3. A composition of matter comprising a resin-like chlorinated diphenyl of an average chlorine content of about 62% and about 7.5% of polyvinylcarbazole.

RUDOLF ENGELHARDT.